United States Patent
Pejaver (10) Patent No.: US 8,639,085 B2
(45) Date of Patent: Jan. 28, 2014

(54) SYNCHRONIZED VIEWING OF MEDIA CONTENT

(75) Inventor: Rajaram Pejaver, Yardley, PA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 0 days.

(21) Appl. No.: 13/181,276

(22) Filed: Jul. 12, 2011

(65) Prior Publication Data

US 2013/0016955 A1    Jan. 17, 2013

(51) Int. Cl.
*H04N 5/931* (2006.01)

(52) U.S. Cl.
USPC .......................................................... 386/206

(58) Field of Classification Search
USPC ......... 386/200, 201, 203, 205, 206, 207, 221, 386/222, 239, 248
See application file for complete search history.

(56) References Cited

U.S. PATENT DOCUMENTS

| 7,555,006 | B2* | 6/2009 | Wolfe et al. .................... 370/465 |
| 2004/0128701 | A1* | 7/2004 | Kaneko et al. ................ 725/136 |
| 2006/0236352 | A1 | 10/2006 | Scott |
| 2007/0094691 | A1* | 4/2007 | Gazdzinski ..................... 725/62 |
| 2009/0217329 | A1 | 8/2009 | Riedl et al. |
| 2012/0039578 | A1* | 2/2012 | Issa et al. ...................... 386/205 |

OTHER PUBLICATIONS

Extended European Search Report Ep 12174809.9—Mailing date: Dec. 6, 2012.

* cited by examiner

*Primary Examiner* — Tat Chio
(74) *Attorney, Agent, or Firm* — Banner & Witcoff, Ltd.

(57) ABSTRACT

Aspects of the disclosure relate to enabling a group of users, each at a different location, to view and control synchronized streamed media content. Users may execute trick play commands plays such as pause, rewind, and fast forward so that all users see the same media content including trick play actions. The media content may originate from streaming content servers or from network-DVR servers.

22 Claims, 7 Drawing Sheets

SYNCHRONIZED VIEWING OF MEDIA CONTENT

This disclosure relates generally to synchronized provision and viewing of media content for multiple users. The disclosure also relates to providing synchronized media content to users and devices located at different locations for simultaneous viewing.

BACKGROUND

Devices and applications that promote social interactions are booming in today's world. Current devices and applications that promote social interaction enable users to form social groups and communicate easily with each other regardless of their geographical location. Currently, close acquaintances that are geographically apart often spend hours talking on the phone, texting, and/or using Internet chat applications. Furthermore, groups of friends may forward videos to each other to share captured events that other group members or friends would find of interest.

However, current devices and applications do not enable groups of users that are remotely located from each other to simultaneously view and control, as a group, programs or media content that may be of interest to the group such as documentaries, concerts, lectures, sporting events, and other media programs and events. A need exists for a system which enables groups of users to easily setup a shared viewing event for the group that may be controlled by any member of the group.

BRIEF SUMMARY

Hence, some aspects of the disclosure relate to methods and systems for sharing a viewing experience, where two or more users can view the same video stream at the same time on their respective devices. The common video stream may be paused, rewound or fast forwarded by one or more users. A separate audio or chat link may allow for the communication of comments during the shared experience.

For example, aspects of the disclosure may relate to enabling a group of viewers, each at a different location, to view the same streamed video content. Depending on the groups' choices, control of trick play commands (pause, rewind, fast forward, etc.) may be allowed to all users or restricted to a subset of viewing parties. All viewers in the group are displayed the same media content, including trick play actions. The video content may originate from streaming content servers or from network-DVR servers.

In another aspect of the disclosure, users may tune their gateways to the specific video stream by clicking on an Internet URL which initiated the streaming of requested content. In an embodiment, a user may arrange a viewing event between two or more parties that are geographically remote. For large viewing events, a user may log into a website to arrange the viewing event for a large number of viewers.

The preceding presents a simplified summary in order to provide a basic understanding of some aspects of the disclosure. The summary is not an extensive overview of the disclosure. It is neither intended to identify key or critical elements of the disclosure nor to delineate the scope of the disclosure. The summary merely presents some concepts of the disclosure in a simplified form as a prelude to the description below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized and structural and functional modifications may be made, without departing from the scope of the present disclosure.

Figure 1:
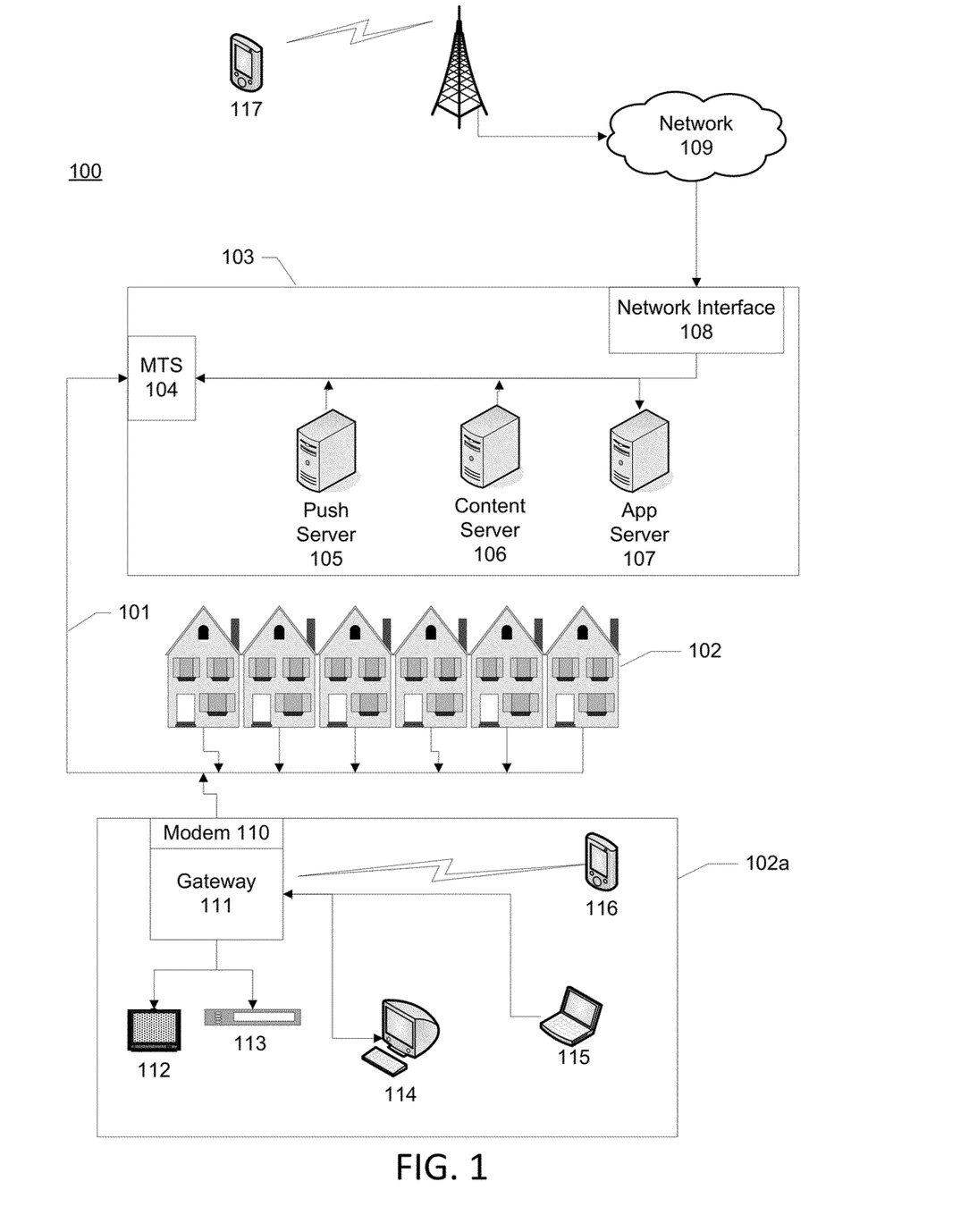
FIG. 1 illustrates an example information distribution network in accordance with an aspect of the disclosure.

FIG. 1 illustrates an example information distribution network 100 on which many of the various features described herein may be implemented. Network 100 may be any type of information distribution network, such as satellite, telephone, cellular, wireless, etc. One example may be an optical fiber network, a coaxial cable network or a hybrid fiber/coax distribution network. Such networks 100 use a series of interconnected communication lines 101 (e.g., coaxial cables, optical fibers, wireless, etc.) to connect multiple premises 102 (e.g., businesses, homes, consumer dwellings, etc.) to a central office or headend 103. The central office 103 may transmit downstream information signals onto the lines 101, and each home 102 may have a receiver used to receive and process those signals.

There may be one line 101 originating from the central office 103, and it may be split a number of times to distribute the signal to various homes 102 in the vicinity (which may be many miles) of the central office 103. The lines 101 may include components not illustrated, such as splitters, filters, amplifiers, etc. to help convey the signal clearly, but in general each split introduces a bit of signal degradation. Portions of the lines 101 may also be implemented with fiber-optic cable, while other portions may be implemented with coaxial cable, other lines, or wireless communication paths. By running fiber optic cable along some portions, for example, signal degradation in those portions may be significantly minimized, allowing a single central office 103 to reach even farther with its network of lines 101 than before.

The central office 103 may include a modem termination system (MTS) 104, such as a cable modem termination system (CMTS), which may be a computing device configured to manage communications between devices on the network of lines 101 and backend devices such as servers 105-107 (to be discussed further below). The MTS may be as specified in a standard, such as the Data Over Cable Service Interface Specification (DOCSIS) standard, published by Cable Television Laboratories, Inc. (a.k.a. CableLabs), or it may be a similar or modified device instead. The MTS may be configured to place data on one or more downstream frequencies to be received by modems at the various homes 102, and to receive upstream communications from those modems on one or more upstream frequencies. The central office 103 may also include one or more network interfaces 108, which can permit the central office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones.

As noted above, the central office 103 may include a variety of servers 105-107 that may be configured to perform various functions. For example, the central office 103 may include a push notification server 105. The push notification server 105 may generate push notifications to deliver data and/or commands to the various homes 102 in the network (or more specifically, to the devices in the homes 102 that are configured to detect such notifications). The central office 103 may also include a content server 106. The content server 106 may be one or more computing devices that are configured to provide content to users in the homes. This content may be, for example, video on demand movies, television programs, songs, text listings, etc. The content server 106 may include software to validate user identities and entitlements, locate and retrieve requested content, encrypt the content, and initiate delivery (e.g., streaming) of the content to the requesting user and/or device.

The central office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Another application server may be responsible for formatting and inserting advertisements in a video stream being transmitted to the homes 102. And as will be discussed in greater detail below, another application server may be responsible for receiving user remote control commands, and processing them to provide an intelligent remote control experience.

An example home 102a may include a modem 110, which may include transmitters and receivers used to communicate on the lines 101 and with the central office 103. The modem 110 may be, for example, a coaxial cable modem (for coaxial cable lines 101), a fiber interface node (for fiber optic lines 101), or any other desired modem device. The modem 110 may be connected to, or be a part of, a gateway interface device 111. The gateway interface device 111 may be a computing device that communicates with the modem 110 to allow one or more other devices in the home to communicate with the central office 103 and other devices beyond the central office. The gateway 111 may be a set-top box (STB), digital video recorder (DVR), computer server, or any other desired computing device. The gateway 111 may also include (not shown) local network interfaces to provide communication signals to devices in the home, such as televisions 112, additional STBs 113, personal computers 114, laptop computers 115, wireless devices 116 (wireless laptops and netbooks, mobile phones, mobile televisions, personal digital assistants (PDA), etc.), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, and others.

Figure 2:
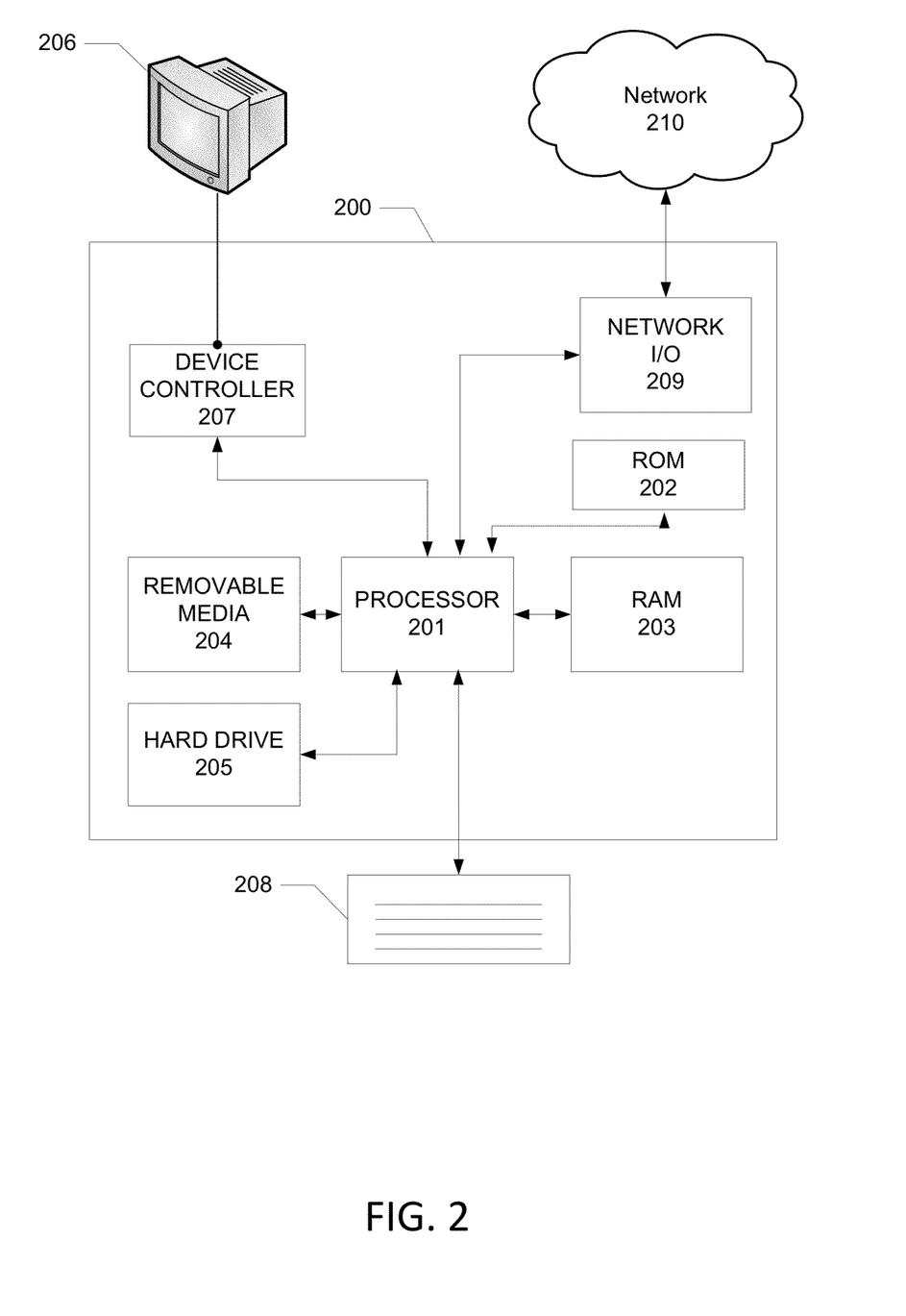
FIG. 2 illustrates exemplary hardware elements on which the various elements described herein can be implemented in accordance with an aspect of the disclosure.

FIG. 2 illustrates general hardware elements that can be used to implement any of the various computing devices discussed above. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disc (CD) or digital versatile disc (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and network 210 may include the communication lines 101 discussed above, the external network 109, an in-home network, a provider's wireless, coaxial, fiber, or hybrid fiber/coaxial distribution system (e.g., a DOCSIS network), or any other desired network.

Various features described herein enable simultaneous viewing of programs to group members located at different locations. Group viewing of media content may be popular for live content such as sports events, with the capability to pause and rewind the stream. For example, a group of users may watch a game live, while reviewing questionable umpire calls or pausing plays to discuss players statistics or upcoming plays, even though they are not in the same room. In addition, to users such as friends, aspects of this disclosure may be appreciated by teachers who can show video content to a class while discussing it on an audio bridge. For example, an art history teacher may show her class a documentary on "King Tut's Tomb", and pause or rewind the video while explaining it. As a further example, a financial planner may discuss a video on derivatives with prospective clients, while taking questions and adding explanations to the video content. Enabling users to upload and contribute their own content to an asset library may enhance social interaction among users. Such and other aspects of the disclosure will be described in detail below.

Figure 3:
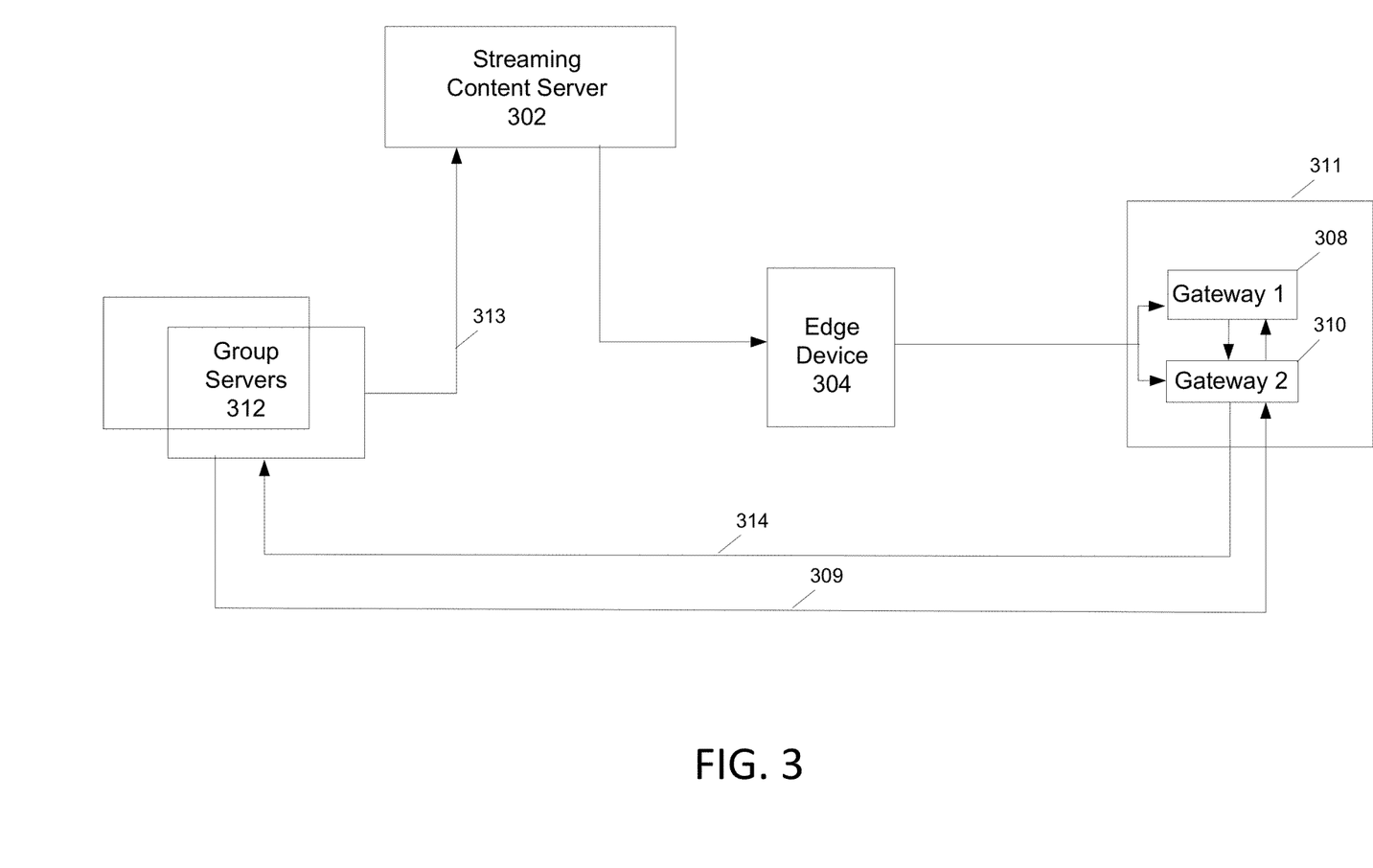
FIG. 3 illustrates a system for providing streamed media content to a group of users in accordance with an aspect of the disclosure.

FIG. 3 illustrates a system for providing media content to a group of users in accordance with an aspect of the disclosure. In FIG. 3, a streaming content server 302 provides media content to edge device 304, such as an edge QAM device. In an embodiment, edge device 304 may analyze and convert the received media content into a different format for delivery to gateways 308 and 310. As shown in FIG. 3, gateway 1 (308)

and gateway 2 (310) may be located in a first service area 311. The first service area 311 may represent a geographical location such as a neighborhood or zip code. For instance, in an embodiment, the first service area 311 may represent a suburb of Philadelphia. In addition, gateway 1 (308) and gateway 2 (310) may be included in service area 311 but may not be physically located in the same premises, such as a user's home 102. For example, gateway 1 (308) may be located in a user's home in a suburb of Philadelphia and gateway 2 (310) may be located in a neighbor's home in the same suburb of Philadelphia.

In an aspect of the disclosure, content in an MPEG stream may be streamed using UDP/IP to an edge QAM. The edge device 304 may analyze and reformat the content before transmitting to gateway 1 (308) and gateway 2 (310). If all the users are in the same service group 311, then EMMs (entitlement management messages) may be generated to allow each user in the group to tune and decrypt the content. In another embodiment, if users are in different service groups, then the streaming content server 302 (or an associated device) may transmit copies of the content over a backbone network (e.g., an IP backbone network) to multiple edge devices. In an embodiment, multicast transmissions may also be utilized.

In another aspect of the disclosure, an application server such as a group server 312 may be used to select a streaming content server such as streaming content server 302 and/or edge device 304. Those skilled in the art will realize that application server 312 may be a single application server or may comprise numerous operatively connected application servers. In an embodiment, group server 312 may allocate a channel so that all users via their gateway device may tune to the selected channel to view a program.

In another aspect of the disclosure, commands and responses may be transmitted between, among other devices, gateway 1 (308), gateway 2 (310), and group server 312. For instance, a group of users may be interested in watching a prime time television comedy show. The users may be located in different geographical areas but may still be located in the same service area such as service area 311. Group server 312 may select streaming content server 302 and edge device 304 to deliver the television comedy show to both gateway 1 (308) and gateway 2 (310) on a selected channel to each user of the group.

In an embodiment, group server 312 may transmit tune commands to gateways 1 (308) and 2 (310) as shown in communication path 309. Gateways 1 (308) and 2 (310) may use the information received to tune to the same video stream being transmitted from streaming content server 302. In an embodiment, streaming content server 302 may include time stamp information within the content stream so that content may be simultaneously viewed by users in the group.

In an aspect of the disclosure, any user in the group may issue trick play commands to control simultaneous presentation of the media content to all members of the group viewing the media content. For instance, a user may pause, rewind, fast forward, or stop the program presentation for all members of the group viewing the show regardless of their geographical location. This may enable a user to highlight a certain portion of a show to all users in the group or replay a favorite portion of the show. In an embodiment, all users of the group will see simultaneous and consistent "synchronized" media content including any executed trick play effects. Those skilled in the art will realize that numerous other trick plays may be implemented by various features of the present disclosure such as but not limited to skip thirty seconds ahead, jump back thirty seconds, fast forward faster, slow play, bookmark, and jump to bookmark.

The commands or trick plays may be received by group server 312 from any user or device as shown in communication path 314. In an embodiment, group server 312 may compare and rank commands received from all gateways of the group and determine which command or commands should be transmitted to streaming content server 302 for execution. In addition, group server 312 may determine an order of execution for the received commands. Those commands or trick plays to be executed may be transmitted to streaming content server 302 via connection path 313. The streaming content server 302 then transmits to all group member devices (e.g., gateways 308 and 310 and all other member devices) through one or more edge devices content that has been altered based on a command or trick play. For example, if a fast forward command is received, the streaming content server 302 will implement the fast forward command and provide fast forwarded content to the group member devices.

In an aspect of the disclosure, ranking or sequencing the trick play commands may be based on the time of origination or on the relative priority of the gateway that originated the command. Further, algorithms may be applied to make the resulting action more acceptable to users. For example, if a Pause command and a Play command are received almost simultaneously from two gateways with equal priority, then the Play command may be dropped as a courtesy to the user who may have wanted to examine the displayed scene more closely. As another example, gateways that send excessive commands may have their priority lowered, as a method to mitigate disruptive users.

Figure 4:
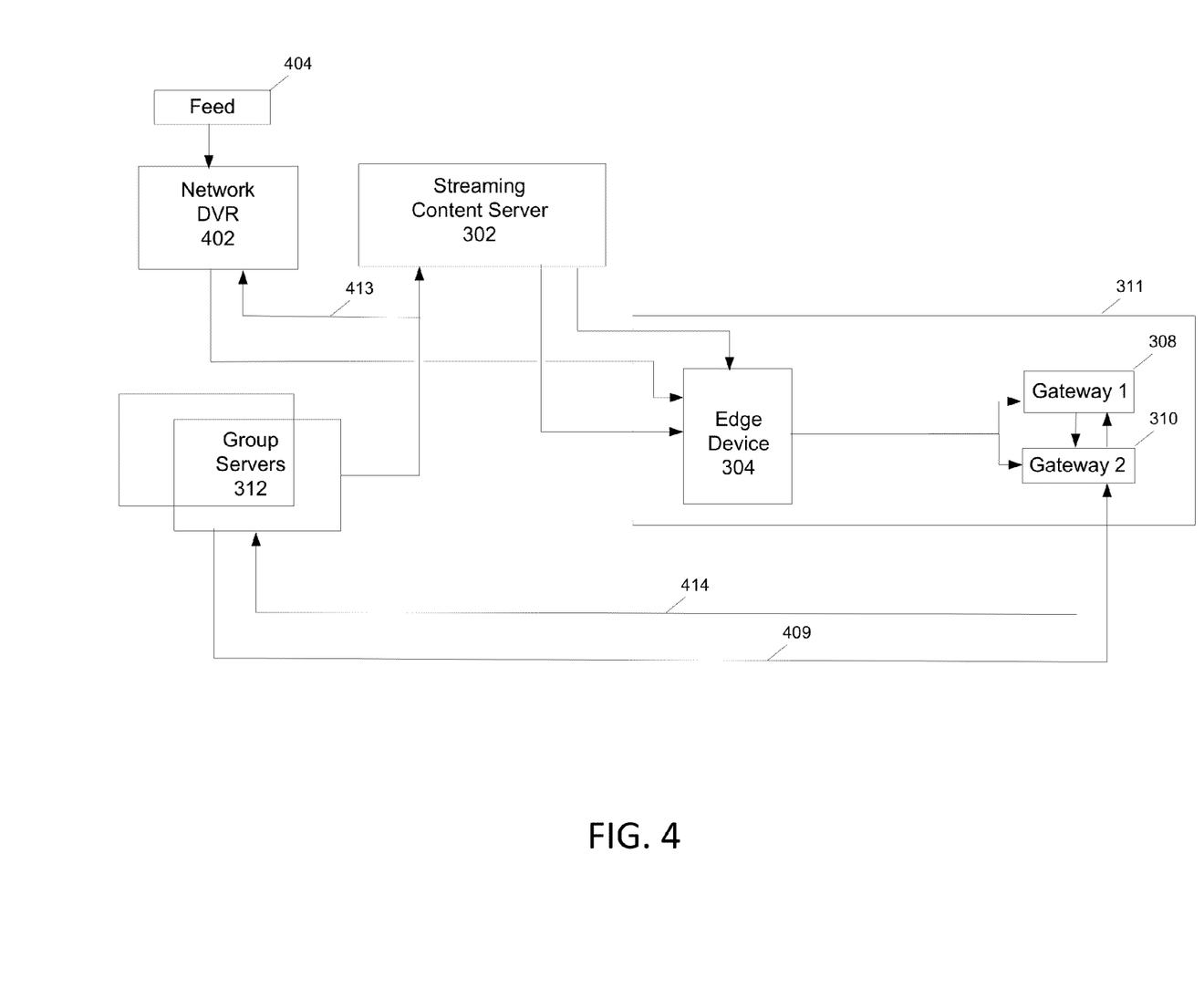
FIG. 4 illustrates a system for providing simultaneous streamed media content from stored content to a group of users in accordance with an aspect of the disclosure.

FIG. 4 illustrates a system for providing "synchronized" streamed media content from stored content to a group of users in accordance with an aspect of the disclosure. In FIG. 4, a network DVR (digital video recorder) 402 may be used to store live or linear feeds such as feed 404. Stored live or linear feeds may include sporting events that users may be interested in watching at a more convenient time than the live presentation of the sporting event. In an embodiment, the network DVR enables live video to be stored in a group-private area on a network DVR storage server and streamed to users in the group on command.

For instance, a group of users may be interested in watching a football game that was previously stored in a group-private storage area of network DVR 402. The users of the group may be located in different geographical areas but may still be located in the same service area such as service area 311. Group server 312 may select network DVR 402 and edge device 304 to deliver the streamed football game to both gateway 1 (308) and gateway 2 (310) on a selected channel to each user of the group.

In an embodiment, group server 312 may transmit tune commands to gateways 1 (308) and 2 (310) as shown in communication path 409 of FIG. 4. Gateways 1 (308) and 2 (310) may use the information received to tune to the same video stream being transmitted from network DVR 402. In an embodiment, network DVR 402 may include time stamp information within the content stream so that the gateways may precisely synchronize the content being displayed as it is being simultaneously viewed by users in the group.

In an aspect of the disclosure, any user in the group may issue trick play commands to control simultaneous presentation of the media content to all members of the group viewing the media content. For instance, a user may pause, rewind, fast forward, or stop the football game for all members of the group viewing the show regardless of their geographical location, and the group server 312 may send time coded trick play information to the network DVR 402 for execution. This may enable users to highlight certain plays of the game or to review penalty calls during the game. In an embodiment, all users of the group see "synchronized" media content including any executed trick play effects.

In another aspect of the disclosure, only members of the group may be able to access the content stored in the group-private storage area of network DVR 402. In addition, content forwarded from network DVR 402 (or streaming content server 302) may be encrypted during transmission and only authorized viewers may be permitted to join and access the content.

The commands or trick plays may be received by group server 312 as shown in communication path 414. In an embodiment, group server 312 may compare and rank commands received from all gateways of the group and determine which command or commands should be transmitted to network DVR 402 for execution. In addition, group server 312 may determine an order of execution for the received commands. Those commands or trick plays to be executed may be transmitted to network DVR 402 via connection path 413. The DVR 402 then transmits to all group member devices (e.g., gateways 308 and 310 and all other member devices) through one or more edge devices content that has been altered based on a command or trick play. For example, if a rewind command is received, the DVR 302 will implement the rewind command and provide rewound content to the group member devices.

Figure 5:
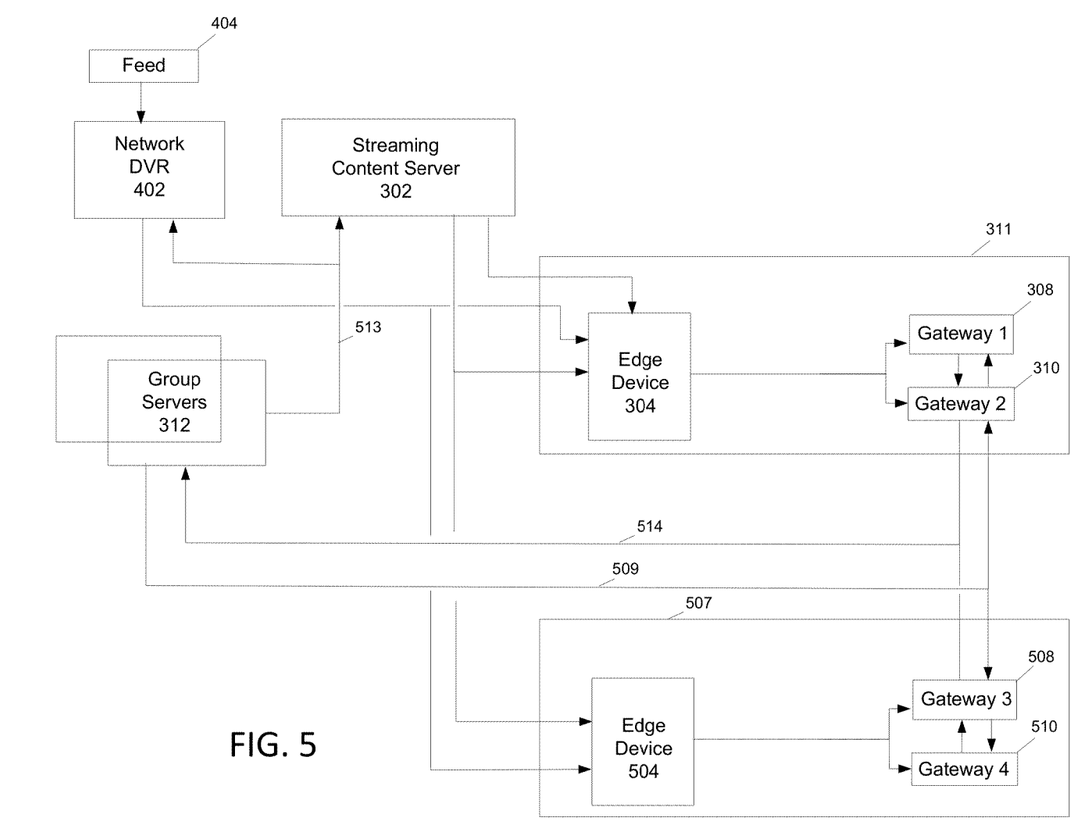
FIG. 5 illustrates a system for providing simultaneous streamed media content from a streaming content server to users in the same service areas but different service groups in accordance with an aspect of the disclosure.

FIG. 5 illustrates a system for providing simultaneous streamed media content from a streaming content server to users in the same service areas but different service groups in accordance with an aspect of the disclosure. In FIG. 5, streaming content server 302 provides media content to both the edge device 304 and an edge device 504 located at different central offices or headends. For instance, edge device 304 and gateways 1 (308) and 2 (310) may be located in service group 311 and edge device 504 and gateways 3 (508) and 4 (510) may be located in service group 507. The service groups may represent different areas in a city or neighborhood. For example, edge device 304 may be located in a central office in North Philadelphia and edge device 504 may be located in a different central office in South Philadelphia.

In an embodiment, edge device 304 and edge device 504 may analyze and convert the received media content into different formats for delivery to their respective gateways. In an embodiment, streaming content server 302 may multicast the media content to edge device 304 and edge device 504.

In an aspect of the disclosure, content (such as MPEG content) may be streamed using UDP/IP to edge device 304 and edge device 504. Edge devices 304 and 504 may analyze and reformat the content before transmitting to gateways 1 (308) and 2 (310) and gateways 3 (508) and 4 (510). EMMs (Entitlement Management Messages) may be generated to allow each user in the group to tune and decrypt the media stream.

In another aspect of the disclosure, commands and responses may be transmitted between gateway 1 (308), gateway 2 (310), gateway 3 (508), gateway 4 (510) and group server 312. In an embodiment, group server 312 may transmit tune commands to gateways 1 (308), 2 (310), 3 (508) and 4 (510) as shown in communication path 509. Gateways 1 (308), 2 (310), 3 (508) and 4 (510) may use the information received to tune to the same video stream being transmitted from streaming content server 302. In an embodiment, streaming content server 302 may include time stamp information within the content stream so that the gateways may precisely synchronize the content being displayed as it is being simultaneously viewed by users in the group.

In an aspect of the disclosure, any user in the group may issue trick play commands to control simultaneous presentation of the media content to all members of the group viewing the media content. For instance, a user may pause, rewind, fast forward, or stop the program presentation for all members of the group viewing the show regardless of their geographical location. This may enable a user to highlight a certain portion of a show to all users in the group or replay a favorite portion of the show. In an embodiment, all users of the group see "synchronized" media content including any executed trick play effects.

The commands or trick plays may be received by group server 312 as shown in communication path 514. In an embodiment, group server 312 may compare and rank commands received from all gateways of the group and determine which command or commands should be transmitted to streaming content server 302 for execution. In addition, group server 312 may determine an order of execution for the received commands. Those commands or trick plays to be executed may be transmitted to streaming content server 302 or network DVR 402 (or both) via connection path 513. The streaming content server 302 or DVR 402 may then transmit to all group member devices (e.g., gateways 308, 310, 508 and 510 and all other member devices) through one or more edge devices content that has been altered based on a command or trick play. For example, if a rewind command is received, the DVR 302 can implement the rewind command and provide rewound content to the group member devices.

Figure 6:
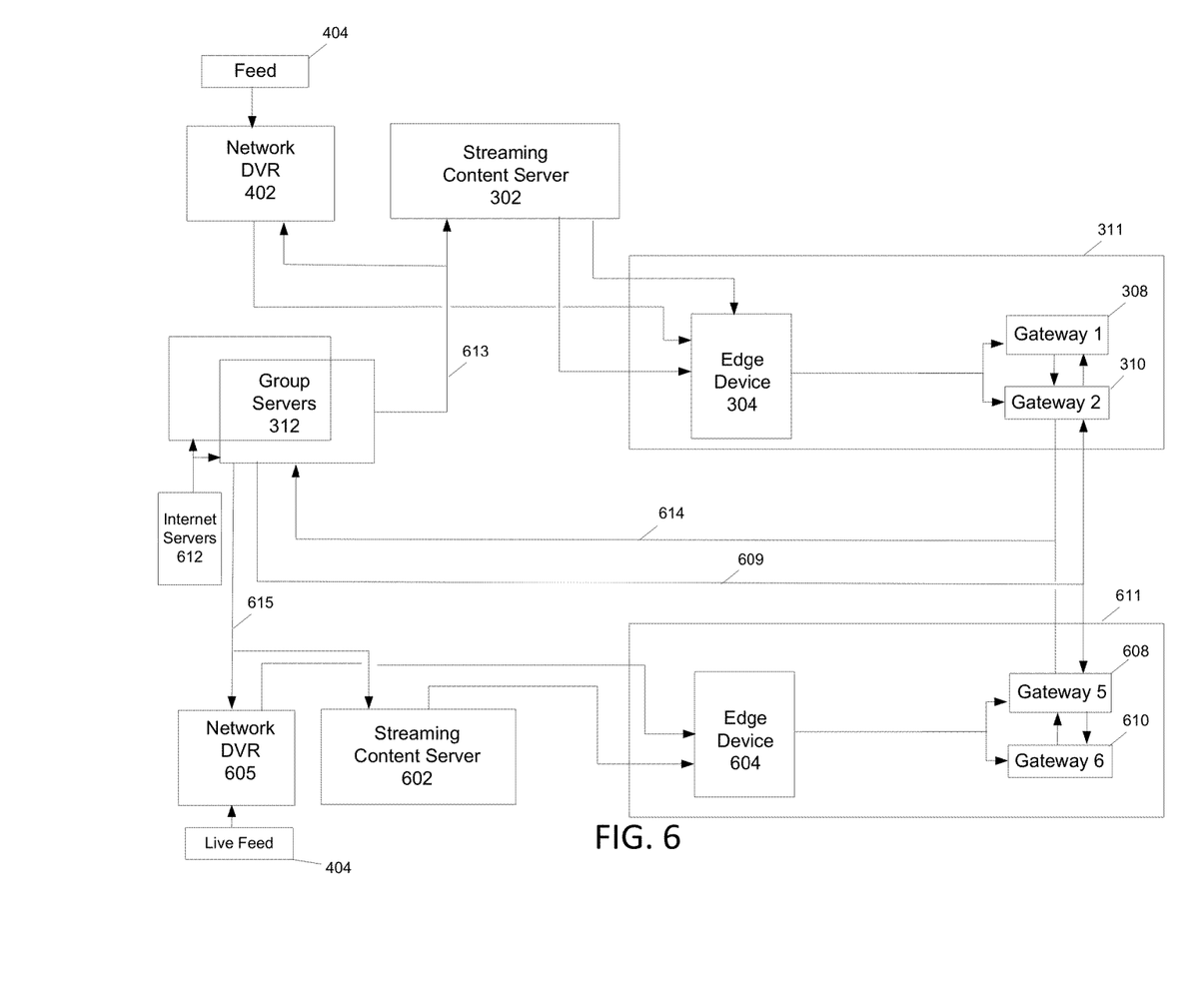
FIG. 6 illustrates a system for providing simultaneous streamed media content from multiple streaming servers to a group of users in accordance with an aspect of the disclosure.

FIG. 6 illustrates a system for providing simultaneous streamed media content from multiple streaming servers to a group of users in accordance with an aspect of the disclosure. In an aspect of the disclosure, instead of routing media content across wide distances, it may be more efficient to use multiple synchronized streaming content servers to stream media content to various groups of users. In FIG. 6, two streaming content servers 302 and 602 may be used to stream synchronized media content to users that are geographically distant. For example, gateway 1 (308) and gateway 2 (310) may be located in service area 311 which may represent a suburb of Philadelphia. In addition, gateway 5 (608) and gateway 6 (610) may reside in service area 611 which may represent the State of Utah.

In another aspect of the disclosure, commands and responses may be transmitted between gateway 1 (308), gateway 2 (310), gateway 5 (608), gateway 6 (610) and group server 312. In an embodiment, group server 312 may transmit tune commands to gateways 1 (308), 2 (310), 5 (608) and 6 (610) as shown in communication path 609. Gateways 1 (308), 2 (310), 5 (608) and 6 (610) may use the information received to tune to the video streams being transmitted from streaming content servers 302 and 602. In an embodiment, streaming content servers 302 and 602 may include time stamp information within the content stream so that the gateways may precisely synchronize the content being displayed as it is being be simultaneously viewed by users in the group.

In an aspect of the disclosure, any user in the group may issue trick play commands to control simultaneous presentation of the media content to all members of the group viewing the media content. For instance, a user may pause, rewind, fast forward, or stop the program presentation for all members of the group viewing the show regardless of their geographical location such as Philadelphia or Utah. This may enable users to highlight a certain portion of a program to all users in the group or replay a favorite portion of the show. In an embodiment, all users of the group are displayed simultaneous and consistent media content including any executed trick play effects.

The commands or trick plays may be received by group server 312 as shown in communication path 614. In an embodiment, group server 312 may compare and rank commands received from all gateways of the group and determine which command or commands should be transmitted to both streaming content servers 302 and 602 for execution. In addition, group server 312 may determine an order of execution for the received commands. Those commands or trick plays to be executed may be transmitted to both streaming content servers 302 and 602 via connection paths 613 and 615. The streaming content servers 302 and 602 may then transmit to all group member devices (e.g., gateways 308, 310, 608 and 610 and all other member devices) through one or more edge devices content that has been altered based on a command or trick play. For example, if a pause command is received, the streaming content servers 302 and 602 can implement the pause command and provide paused content to the group member devices.

In an alternative embodiment, group server 312 may transmit the commands or trick plays to network DVRs 402 and 605 for execution if the requested media stream is stored on network DVRs. Those skilled in the art will realize that copies of particular media assets such as sporting events may be stored in numerous network DVRs scattered throughout a distribution network. Depending on the requested content group server 312 may determine the most appropriate network DVR device to stream the media content in order to obtain the requested media content with the least amount of overhead and bandwidth utilization.

In an aspect of the disclosure, group server 312 may transmit consolidated trick play commands to multiple streaming content servers such as streaming content servers 302 and 602. In an embodiment, the commands may be marked with NPT/SMPTE time codes for accurate control. Users may receive media content from different streaming content servers, but the streams may be practically identical. Transmission of commands using group server 302 and utilization management of various streaming content servers and network DVRs by the group server may consume less network bandwidth than current media distribution techniques.

In another aspect of the disclosure, users may be added or removed dynamically, but the selection of the streaming content server may not change. After the video channel has been set up, a command may be sent to the user's gateway to tune it to the specific channel.

In another aspect of the disclosure, a user may arrange a viewing event between two or more parties that are geographically remote. For large viewing events, a user may log into a website to arrange the viewing event for a large number of viewers. The website may be a secure website with specific security protocols. The website may allow the user to setup different viewing parameters that all viewers may have to adhere to during the viewing event. In either case, users may be invited to join by sending them a message (email, tweet, etc.) containing a URL that uniquely identifies the video stream. The URL may also be posted on a website. Clicking on the URL may take the invitee to a website where they are asked to authenticate themselves and to confirm joining the stream. Upon successful confirmation, group server 302 may set up the content stream for all of the invitees by transmitting tuning information to their respective gateways. A message may then be transmitted to the invitee's gateway causing it to tune in to the video stream at the appropriate time.

In another alternative embodiment, users may invite others using an unbound interactive TV (EBIF/OCAP) application. The inviter may start a video stream, and then invoke the application. The inviter may enter the user identifiers to select the invitees. In an embodiment, a user interface screen may appear on the invitee's display device asking them to confirm joining the stream. Upon successful confirmation, the group server 302 may setup and initiate the stream.

Figure 7:
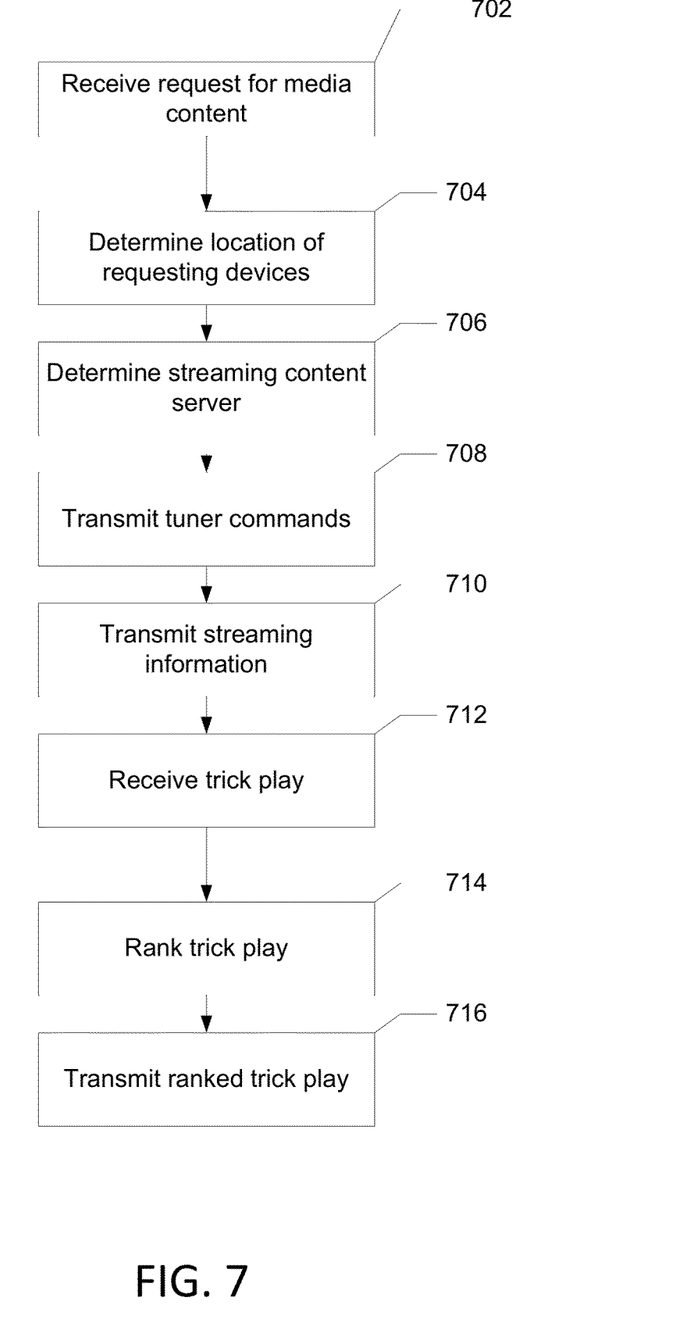
FIG. 7 illustrates a method for displaying synchronized media content for at least two geographically distant users in accordance with an aspect of the disclosure.

FIG. 7 illustrates a method for displaying synchronized media content for at least two geographically distant users, in accordance with an aspect of the disclosure. In FIG. 7, at step 702, a server, such as group server 302, may receive a request from at least two gateway devices for media content from the at least two geographically distant users. Alternatively, the request may be received from a first gateway, with a second gateway joining at a later point in time. Next, in step 704, a location for each of the requesting gateways devices may be determined. Based on the determined locations for each of the gateway devices, in step 706 a streaming content server may be determined to provide the requested media content. In step 708, tuner commands may be transmitted to the at least two gateway devices. In an embodiment, the tuner commands may include information for viewing the requested media content. Next, in step 710 streaming information may be transmitted to the determined streaming content server. In an aspect of the disclosure, the streaming information may include data for synchronizing displaying of the media content requested by the geographical distant users. Those skilled in the art will realize that order of steps 702 though 710 may be altered in various different embodiments and still be within the scope of the present disclosure.

In an aspect of the disclosure, a trick play command may be received from a first gateway of the at least two gateways as illustrated in step 712. In step 714, the received trick play may be ranked with other received trick play commands or functions. Next, in step 716, the received trick play may be transmitted to the determined streaming content server for execution of the trick play to provide the synchronized media content.

Aspects of the disclosure have been described in terms of illustrative embodiments thereof. While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the features of the aforementioned illustrative examples may be utilized alone or in combination or subcombination with elements of the other examples. For example, any of the above described systems and methods or parts thereof may be combined with the other methods and systems or parts thereof described above. For example, one of ordinary skill in the art will appreciate that the steps illustrated in the illustrative figures may be performed in other than the recited order, and that one or more steps illustrated may be optional in accordance with aspects of the disclosure. It will also be appreciated and understood that modifications may be made without departing from the true spirit and scope of the present disclosure. The description is thus to be regarded as illustrative instead of restrictive on the present disclosure.

I claim:

1. A method comprising:
  receiving, at a computing device, a request for media content from at least first and second gateway devices that are located in different locations;
  transmitting information comprising data for synchronizing transmission of the media content requested by the at least first and second gateway devices;
  receiving, a trick play command from the first gateway device;

determining a total number of trick play commands received from the first gateway device;

comparing the total number of trick play commands to a threshold value and lowering execution priority of the trick play command from the first gateway device if the total number of trick play commands exceeds the threshold value; and ranking the trick play command to form a ranked trick play command which comprises, execution priority of the trick play commands.

2. The method of claim 1, wherein the trick play command comprises a pause command.

3. The method of claim 1, wherein the trick play command comprises a fast forward command.

4. The method of claim 1, wherein the trick play command comprises a rewind command.

5. The method of claim 1, wherein the information includes time stamp information for use in synchronizing viewing of the media content.

6. The method of claim 1, wherein the first and second computing devices are located in a same service area.

7. The method of claim 1, further comprising transmitting the ranked trick play command for execution of the ranked trick play command with respect to the media content.

8. A method comprising:

receiving a request from at least first and second gateway devices for media content;

determining locations for the at least first and second gateway devices;

determining service groups for the at least first and second gateway devices based on the locations of the at least first and second gateway devices;

determining at least one streaming content source based on the determined service groups for the at least first and second gateway devices;

transmitting streaming information to the at least one streaming content source, the streaming information comprising data for synchronizing transmission of the media content requested by the at least first and second gateway devices;

receiving a trick play command from a the first gateway device;

determining a total number of trick play commands received from the first gateway device;

comparing the total number of trick play commands to a threshold value and lowering execution priority of the trick play command from the first gateway if the total number of trick play commands exceeds the threshold value; and ranking the trick play command to form a ranked trick play command which comprises, execution priority of the trick play command.

9. The method of claim 8, wherein the at least one streaming content source comprises a streaming content server.

10. The method of claim 8, wherein the at least one streaming content source comprises a network digital video recorder.

11. The method of claim 8, wherein the trick play command comprises a rewind command.

12. The method of claim 8, wherein the streaming information includes time stamp information for use in synchronizing transmission of the media content.

13. The method of claim 8, wherein the at least first and second gateways devices are located in a same service area.

14. The method of claim 8, further comprising transmitting the ranked trick play command to the at least one streaming content source for execution of the ranked trick play command with respect to the media content.

15. A method comprising:

determining at least two streaming content sources to provide media content to at least first and second gateway devices, the at least first and second gateways devices located in different locations;

transmitting streaming information to the at least two streaming content sources, the streaming information comprising data for synchronizing transmission of the media content to the at least first and second gateway devices;

receiving a trick play command from the first gateway device;

determining a total number of trick play commands received from the first gateway device;

comparing the total number of trick play commands to a threshold values and lowering execution priority of the trick play command from the first gateway device if the total number of trick play commands exceeds the threshold value; and ranking the trick play command to form a ranked trick play command which comprises, execution priority of the trick play command.

16. The method of claim 15, wherein the trick play command comprises a rewind command.

17. The method of claim 15, wherein the streaming information includes time stamp information for use in synchronizing transmission of the media content.

18. The method of claim 15, further comprising: receiving a request to schedule an event for a specified group of users.

19. The method of claim 18, further comprising:

transmitting a notification to the specified group of users regarding a scheduled group viewing event.

20. The method of claim 15, further comprising transmitting the ranked trick play command to the streaming content sources for execution of the ranked trick play command with respect to the media content.

21. A method comprising:

determining geographical locations for at least first and second computing devices requesting media content;

determining a source to provide the media content responsive to the geographical locations;

transmitting to the at least the first and second computing devices commands for initiating streaming of the media content;

substantially synchronizing transmission of the media content to the at least first and second computer devices;

receiving a trick play command from the first computing device;

determining a total number of trick play commands received from the first computing device;

comparing the total number of trick play commands to a threshold value; and lowering execution priority of the trick play command from the first computing device if the total number of trick play commands exceeds the threshold value; and ranking the trick play command to form a ranked trick play command which comprises execution priority of the trick play commands.

22. The method of claim 21, further comprising transmitting the ranked trick play command to the source for execution of the ranked trick play command with respect to the media content.

* * * * *

UNITED STATES PATENT AND TRADEMARK OFFICE
CERTIFICATE OF CORRECTION

PATENT NO. : 8,639,085 B2  
APPLICATION NO. : 13/181276  
DATED : January 28, 2014  
INVENTOR(S) : Rajaram Pejaver Page 1 of 1

It is certified that error appears in the above-identified patent and that said Letters Patent is hereby corrected as shown below:

On the Title Page item (56), Column 2, Other Publications, Line 1:
   Please delete "Ep" and insert --EP--, On the Title Page item (57), Column 2, Abstract, Line 4:
   Before "such", delete "plays",

In the Claims

Column 11, Claim 8, Line 41:
   In Claim 8, after "from", delete "a",

Column 11, Claim 13, Line 64:
   In Claim 13, delete "gateways" and insert --gateway--, Column 12, Claim 15, Line 6:
   In Claim 15, delete "gateways" and insert --gateway--.

Signed and Sealed this  
Twenty-ninth Day of September, 2015

Michelle K. Lee  
*Director of the United States Patent and Trademark Office*